United States Patent [19]

Leib

[11] Patent Number: 4,958,376
[45] Date of Patent: Sep. 18, 1990

[54] ROBOTIC VISION, OPTICAL CORRELATION SYSTEM

[75] Inventor: Kenneth G. Leib, Wantagh, N.Y.

[73] Assignee: Grumman Aerospace Corporation, Bethpage, N.Y.

[21] Appl. No.: 236,519

[22] Filed: Aug. 25, 1988

Related U.S. Application Data

[63] Continuation-in-part of Ser. No. 814,209, Dec. 27, 1985, abandoned.

[51] Int. Cl.$^5$ .............................................. G06K 9/00
[52] U.S. Cl. ................................. 382/31; 350/162.12
[58] Field of Search ................... 382/31; 350/162.12, 350/162.13, 162.14

[56] References Cited

U.S. PATENT DOCUMENTS 3,779,492 12/1973 Grumet .............................. 350/3.73
3,851,308 11/1974 Kawasaki et al. ................ 340/146.3

Primary Examiner—Leo H. Boudreau
Assistant Examiner—Michael Cammarata
Attorney, Agent, or Firm—Scully, Scott, Murphy & Presser

[57] ABSTRACT

A robotic vision, optical correlation system which optically compares an input image with optical information stored in a multiple array of matched filters to provide identification and aspect information about the input image. The input image is incident upon a spatial light modulator, and the input image spatially modulates a coherent beam of radiation. A multiple holographic lens has the spatially modulated radiation beam incident thereon, and performs a multiple number of Fourier transformations thereon to obtain an array of a multiple set of Fourier transforms of the spatially modulated radiation beam. The array of matched filters has the array of Fourier transforms incident thereon, and each matched filter comprises a Fourier transform hologram of an aspect view of an object of interest. Each matched filter passes an optical correlation signal in dependence upon the degree of correlation of the Fourier transform of the spatially modulated radiation beam with the Fourier transform recorded by the matched filter. An inverse Fourier transform lens receives the optical correlation outputs of the array of matched filters, and performs an inverse Fourier transformation on each optical correlation output. A detector then detects the inverse Fourier transform of each optical correlation output, and produces a detector output signal representative thereof. A processing circuit compares the relative magnitudes of the signals to determine aspect information about the input image. The present invention includes a normalizing means for each matched filter channel in the system, which can be electronic or optical, to normalize the signals for the different matched filters. The normalizing means operates on the basis of a separate angular response curve which is generated for each matched filter.

15 Claims, 3 Drawing Sheets

ROBOTIC VISION, OPTICAL CORRELATION SYSTEM

This patent application is a continuation-in-part application of parent application Ser. No. 814,209, filed Dec. 27, 1985.

BACKGROUND OF THE INVENTION

1. Field of the Invention

The present invention relates generally to a robotic vision, optical correlation system which utilizes matched filters to provide object identification, and to provide aspect information, such as positional and size information, about an object, and more particularly pertains to a robotic vision system as described which utilizes primarily parallel optical processing therein.

2: Discussion of the Prior Art

The study and application of robotic vision systems is an area that is accelerating in interest in both commercial and military activities. Current commercial applications have been identified for machine operations and production lines. In the prior art, robot manipulators have been utilized in relatively large scale manufacturing assembly lines to perform simple manipulative tasks including loading and unloading machines, stacking parts, spray painting, and spot-welding. These machines generally responded to a set of highly specific program commands wherein the positioning and orientation of the workpieces manipulated were known with considerable precision. In general, the programming of such a manipulator was relatively complicated, and the program was useful only if the positioning of the workpieces was held within relatively precise tolerances.

Recently, there has been an attempt to increase the flexibility of such manipulators by the addition of various sensory capabilities. Tactile and auditory capabilities are presently being developed along with visual capabilities, as concerns the present invention. Range finding, and structured light and binocular vision techniques have been employed in such robotic vision systems. However, none of these systems are particularly useful in applications requiring identification of an object, and a determination of its location and orientation. Furthermore, the known robotic vision systems require a substantial amount of processing time between vision sensing and object identification.

A number of robotic or machine vision systems have been disclosed and analyzed in the prior art relative to their abilities to perform specific intended tasks. These systems have usually been hybrid in nature, with the sensor often being an analog device, and the processing and articulation control frequently being digital in nature. A further bifurcation in this technology is the choice between digital and analog object recognition. Digital systems often rely upon video input and algorithms to sort out objects and parts according to size and aspect. The memory libraries are restricted only by the size of the computer memory. There are fewer optical systems, and most of them rely upon electronic processing to some degree.

Spight U.S. Pat. No. 4,462,046 discloses an optical vision system in which video cameras are used in association with a computer, and in which off-axis views are stored in the processor. The Fast Fourier Transforms (FFT) are video analyzed and processed in the computer. At best, this system is restricted to thirty frames per second.

In contrast to the Spight system, the present invention performs its processing optically and in parallel at near the speed of light. Many views of many different objects can be stored in a single complex matched filter, and these filters can be specifically designed to handle multiple objects. A further advantage of the subject invention is that specially designed multiple holographic lenses allow many objects and/or many views to be optically processed in parallel, and also the degree of aspect of an object can be determined to a desired degree of resolution.

Grumet U.S. Pat. 3,779,492 is of interest to the present invention, and discloses a matched filter optical correlator system similar to the present invention in which a coherent, optical signal processor is used for recognition of specific known targets. Each matched filter record includes a pair of matched filters that separately process the high and low spatial frequencies. The outputs thereof are combined in a logical AND operation and the target is interrogated for fine features as well as for correct size and shape. The optical memory bank of matched filter pairs comprises diffraction patterns of all resolvable views, in both azimuth and elevation, of a target, thus forming a target recognition comb-filter bank. All views of the recognition bank are simultaneously interrogated optically according to the diffraction pattern of the detected object to determine whether the detected object is the desired target as stored in any of the views in the memory bank.

The present invention differs from and improves upon the Grumet system in several important respects. One embodiment of the subject invention provides an inverse Fourier transform lens array for receiving the optical correlation outputs of an array of matched filters, and each optical correlation output is then directed to a separate detector. Grumet instead illustrates a single lens 29 which directs all of the outputs onto a common detector. The present invention also provides a normalizing means for each individual matched filter for producing a normalized output signal therefrom, and Grumet totally fails to appreciate the need for signal normalization. The separate detector advantageously allows each output signal to be amplified separately, which allows each amplifier to be used for separate normalization of that processing channel. Grumet also fails to appreciate that each matched filter has a separate and individual angular response curve, which should be formulated, and can be utilized to determine aspect information about an object of interest.

SUMMARY OF THE INVENTION

Accordingly, it is a primary object of the present invention to provide a robotic vision, optical correlation system and a method therefor which utilizes the properties of matched filters to provide positional, scale and orientation information about an object of interest. In a robotic system, positional control signals developed by the optical correlation system can be utilized to control robotic articulating arms or devices. The subject invention has application to both moving and stationary objects of interest, and also enables simultaneous processing of an input image of an object of interest with respect to more than one reference object stored in memory.

A more specific object of the present invention to produce a substantially real-time vision system capable of identification and determination of location and orientation of parts in a commercial environment.

The general principle of operation of the present invention is that an object is recognized, its size, location and aspect are determined, and signals are generated for control purposes. This system utilizes the properties of optical matched filters to enable an identification of the object, a determination of its size, a determination of the location of the object, a determination of any angular aspect, and a determination of object velocity, if needed, through successive sightings.

In accordance with the teachings herein, the present invention provides a system for optically comparing an input image with optical information stored in one or more matched filters to provide identification and aspect information about the input image. The input image is incident upon a spatial light modulator, and the input image spatially modulates a coherent beam of radiation. A multiple holographic lens has the spatially modulated radiation beam incident thereon, and performs a multiple number of Fourier transformations thereon to obtain an array of a multiple set of Fourier transforms of the spatially modulated radiation beam. A corresponding array of matched filters has the array of Fourier transforms incident thereon, with each matched filter comprising a Fourier transform hologram of an aspect view of an object of interest, and each matched filter passes an optical correlation signal in dependence upon the degree of correlation of the Fourier transform of the spatially modulated radiation beam with the Fourier transform recorded by the matched filters. An inverse Fourier transform lens array receives the optical correlation outputs of the array of matched filters, and performs an inverse Fourier transformation on each optical correlation output. A detector array then detects the inverse Fourier transform of each optical correlation output and produces a detector output signal representative of each optical correlation output.

In accordance with one preferred embodiment, the detector output signals are electronically processed in a processing circuit which compares the relative magnitudes of the signals to determine aspect information about the input image. The processing circuit comprises a normalizing amplifier circuit for each detector output signal, an analog to digital converter for converting each normalized detector output signal to a corresponding digital signal, and comparator circuits for comparing the magnitudes of the corresponding digital signals. The outputs of the comparator circuits are then processed in a logic circuit which develops move right or move left robotic control signals.

The present invention recognizes the need to normalize the outputs of the separate matched filter channels in the optical correlation system. The normalization can be achieved electronically, as by a separate normalization amplifier for the detector of each matched filter channel, wherein the gain of each normalization amplifier is set to compensate for differences in the outputs of the individual matched filters. Alternatively, the normalization can be achieved optically, as by adjusting the amplitude of the light being processed through each individual matched filter channel, as by adjusting the output power of the laser, or by an attenuating filter, which can be a rotatable polarizing filter, in the optical path of each matched filter channel.

The normalization function can also be tied to the individual angular response of each matched filter, and the subject invention recognizes that each matched filter has an individual angular response curve which is normally different for each matched filter. Accordingly, an angular response curve is empirically developed for each individual matched filter. The maximum amplitude signal for all of the angular response curves are then set to be substantially equal to normalize the angular response curves. The angular field of view for each normalized angular response curve is then determined, which allows a determination of the number of matched filters required to yield a desired overall angular detection response for the system.

BRIEF DESCRIPTION OF THE DRAWINGS

The foregoing objects and advantages of the present invention for a robotic vision, optical correlation system may be more readily understood by one skilled in the art with reference being had to the following detailed description of several preferred embodiments thereof, taken in conjunction with the accompanying drawings wherein like elements are designated by identical reference numerals throughout the several views.

FIG. 6 illustrates the angular sensitivity of a matched filter, and more particularly the angular sensitivities of the correlation signals of three matched filters for three possible object positions;

FIG. 7 is a representative illustration of the correlation signals for a system wherein seven angular aspect views are recorded matched filters.

FIG. 8 illustrates a positional control system with signal processing electronics to derive positional control signals;

FIG. 9 illustrates a further embodiment of the present invention with a partitioned array of detectors, and illustrates one optical technique for normalizing the output of each matched filter channel;

FIG. 10 illustrates an exemplary embodiment of an arrangement for the preparation of a MF memory bank for different aspect of interest for an object;

FIG. 11 illustrates an idealized situation in which the angular response curves of all of the matched filters are equal tude and angular range;

FIG. 12 illustrates a realistic situation in which the angular response curve of each matched filter is different in both amplitude and angular range; and FIG. 13 illustrates a normalization of the response curves of FIG. 12 in which the peak amplitudes of each curve are equalized, which results in different angular ranges for each matched filter.

DETAILED DESCRIPTION OF THE DRAWINGS

A number of elements and concepts relating to the present invention are used frequently in this description and are essential to an understanding of the function and general principles of operation of the invention, and accordingly the nature and properties of several of those concepts are discussed hereinbelow initially for convenience.

A holographic lens (HL) is made by recording the interference pattern of an expanding point radiation source and a collimated radiation beam, which produces a hologram of a point source. When the holographic lens (after recording and processing, as on film) is illuminated, it recreates the point source, i.e., it behaves as a lens. If the recording process is initially repeated, a series of point source holograms, or a multiple holographic lens (MHL), can be recorded on the film.

The subject invention utilizes one of several possible distributions in offset angle, position and focal length in a multiple holographic lens array to produce an array of Fourier Transforms of an input spatially modulated, laser radiation beam. In general, the particular requirements of the array will be determined by the particular problem being addressed. In summary, a holographic lens takes a Fourier Transform (FT) of a laser beam illuminated scene or target, and a multiple holographic lens takes, simultaneously, a multiple set of Fourier Transforms. A multiple holographic lens array is usually used in conjunction with a corresponding multiple array of matched filters.

When a lens is illuminated by a spatially modulated collimated beam (as when it is modified spatially by passing through a film of a scene, target, etc.), the lens creates at the focal point the Fourier Transform of the object(s) on the film, which is a basic lens property. When the Fourier Transform is interfered with a collimated (or reference) beam from the same source, an interference pattern results This is called a Fourier Transform hologram, or Matched Filter (MF). It is an optical spatial filter of the input object. When an arbitrary scene is played through the system, the matched filter will pick out and pass the object for which it was made. The signal passed by the filter is Fourier transformed again and a "correlation" plane results. If the matched filter target is present, a sharp correlation signal results, whereas non-target signals result in broad, low correlation signals in the correlation plane.

The present invention uses the sensitivity of a matched filter to object rotation or object scale size. As either of these aspects change (i.e., the object is at a different angle than the one for which the MF is made, or at a different distance, therefore at a different scale size), the correlation signal changes.

Figure 1:
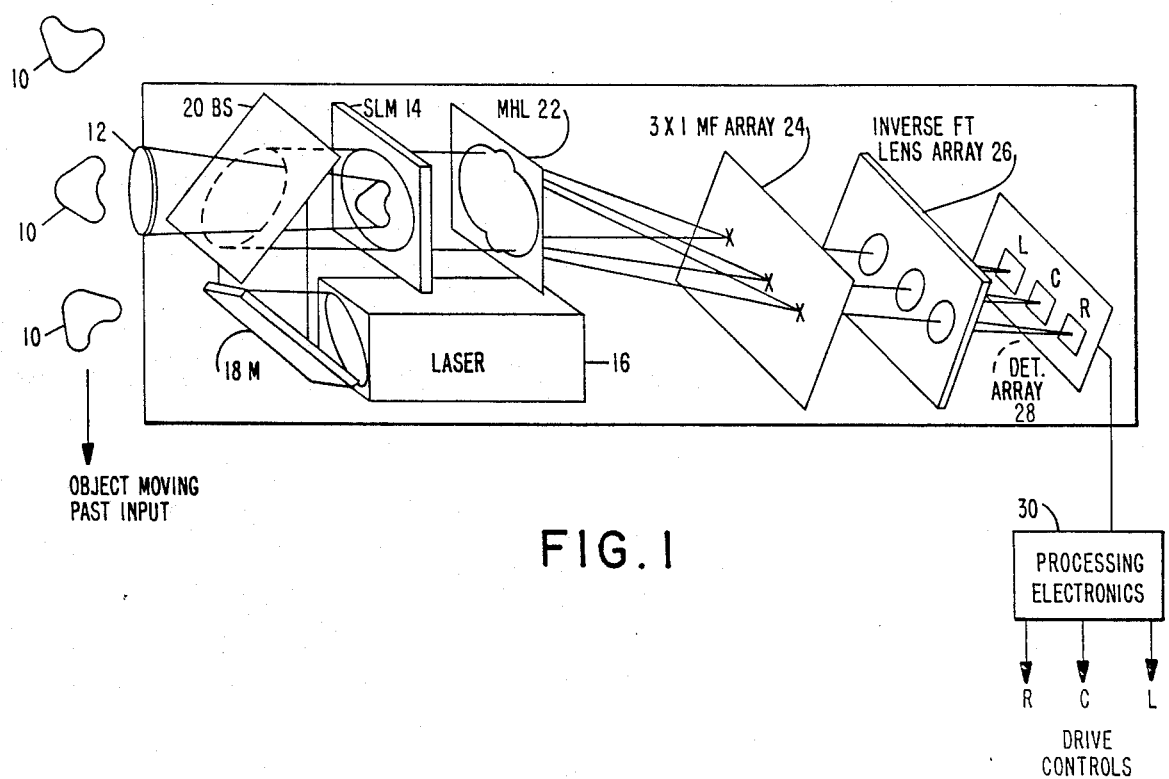
FIG. 1 is an exemplary embodiment of a robotic vision system employing the teachings and illustrating the general principles operation of the present invention.

FIG. 1 illustrates a relatively simple embodiment of an optical correlator employing a memory bank of matched filters pursuant to the teachings of the present invention. An object of interest 10 is moving past the input to the optical correlator, and is imaged by an input lens 12 onto a spatial light modulator (SLM) 14, which spatially modulates the image onto a laser beam from a laser 16, directed thereto by a mirror 18 and beam splitter 20. The spatially modulated laser beam is Fourier transformed by a multiple holographic lens 22 and directed onto a corresponding array of matched filters (MFs) 24. An inverse Fourier Transform lens array 26 inversely Fourier transforms the output of the MFs and directs the outputs thereof onto a detector array 28, the output signals of which are electronically processed at 30, as described in greater detail hereinbelow, to produce output control signals.

A matched filter is a Fourier transform (FT) hologram with properties that are sensitive to an input object's size, angular aspect and input location. These parameters can be predetermined in order to prescribe a set of angle and range (size) lines covering the anticipated object's aspects. The detector can be partitioned to resolve the location to the degree desired.

In the fabrication of a matched filter, the holographic fringe visibility is optimized at a particular spatial frequency that will satisfy the size and/or aspect sensitivity requirements. Because it is unlikely that both requirements can be satisfied simultaneously, a plurality of independent MFs are utilized in the present invention. The nature of different particular applications will generally require significantly different MF sensitivities.

A matched filter is a complex holographic medium, focal length of the Fourier transform lens, contrast ratio, overlap, placement, and spatial frequency dependence. Each of the characteristics can be described using the following carefully developed approaches to qualifying or quantifying matched filters.

(a) In fabricating matched filters of complex objects for the first time, a correlation matrix can be developed, and a representative matrix is shown below.

| Amplitude Transmittance ↑ | .90 | .93 | .97 | .96 | .94 | Optical Exposure Time ↓ |
|---|---|---|---|---|---|---|
| | .91 | .94 | .99 | .97 | .95 | |
| | .93 | .95 | 1.0 | .98 | .96 | |
| | .92 | .94 | .98 | .95 | .94 | |
| | .91 | .93 | .96 | .93 | .91 | |

Reference Signal / Beam Ratio R →

The y axis is amplitude transmittance (amount of light transmitted, going from 0 to 1.0—the opposite of density.) Optical exposure (relative) is often used as the actual parameter, and is shown at the right hand side. The x axis is the Reference beam divided by the Signal beam ratio, designated by R. In practice, one often establishes a given beam ratio, and then varies exposure time. This can be accomplished easily with the correlator shutter, and so this procedure is followed, bearing in mind that the procedure is followed in the dark. This generates a column of values. Then, a new beam ratio R is established, typically +3dB or up two times, and the procedure is repeated.

The values in the matrix are peak correlation values obtained after the photoplates used to make the matched filters are exposed, developed, dried and reinserted in the optical correlator. The matrix development is a long and time consuming process, and depends upon the material, object, etc. This illustrates that just making the matched filter with a given material is a complicated, detailed process because of the complex nature of matched filters.

(b) A second criteria which has been developed is termed the system criteria S.

$$S = (\lambda F)^{-1} \frac{\text{cycles/mm}}{\text{mm}}$$

where $\lambda$ (mm) and F (mm) are respectively the matched filter operational wavelength and the lens focal length. The smaller the value of S, the easier it is to control parametric variation sensitivity, and locational problems also ease with smaller values of S. The system criteria S indicates the extent the MF is spread out on the medium (and therefore, bandwidth, exposure time necessary, etc.).

(c) A third criteria on capacity C was developed to indicate the number of matched filters which can be placed on a photographic plate for recording.

$$\text{Capacity } C = \text{CONSTANT} \times \frac{SPG}{((\Delta\nu)NF\lambda)^2}$$

C is the capacity in matched filters per square centimeter.

S is the split spectrum factor (since the Fourier transform has 180° symmetry, one half or all of the matched filter can be used), and has a value of 1 or 2.

P is the number of overlapped filters at a given location. This can have values up to 30 but conservatively P can be approximately 4.

G is the geometrical packing factor, and depends upon the mix of target objects to be recorded, and values between 1 and 1.5 might be reasonable.

. λ, F have already been explained. Practical values are 0.45 um≦λ≦2 um, and 25≦F≦1500cm.

N.Δγ is the bandwidth of the matched filter.

N is the multiple of Δγ used to obtain 96% of the autocorrelation value. Δγ is usually set to be the frequency range where the matched filter is optimized for holographic contrast ratio.

This explanation illustrates the complexity of matched filters, and all of the factors that must be considered in fabricating them, and when they are complicated, the requirement for performing correct normalization.

Special equipment has been designed to measure a matched filter's sensitivity to angular orientation, scale and contrast. In addition, the above criteria must be applied to each group of matched filters since, for example, Δγ and angular sensitivity are intimately related, and a change in one affects the other. Also, the photographic exposure time Δt has an influence upon Δγ and therefore, angular sensitivity. Consider the value of the system criteria S. When λ is changed or F (or both), S changes, as does Δγ and the angular sensitivity. This illustrates again the requirement for normalization. Similar analyses could also be performed for scale changes, or contrast changes, which require the matched filter quality to be assessed again.

Another important MF factor is the spatial frequency bandwidth. Matched filters can be optimized at any desired frequency, but the degree of object discrimination is often dependent upon the fine details of the object and, thus, the higher frequencies. The frequency requirements must be considered along with the particular object's size, position, and aspect. Along with spatial frequency bandwidth, the angle, size, and matched filter sensitivity must also be considered.

Figure 2:
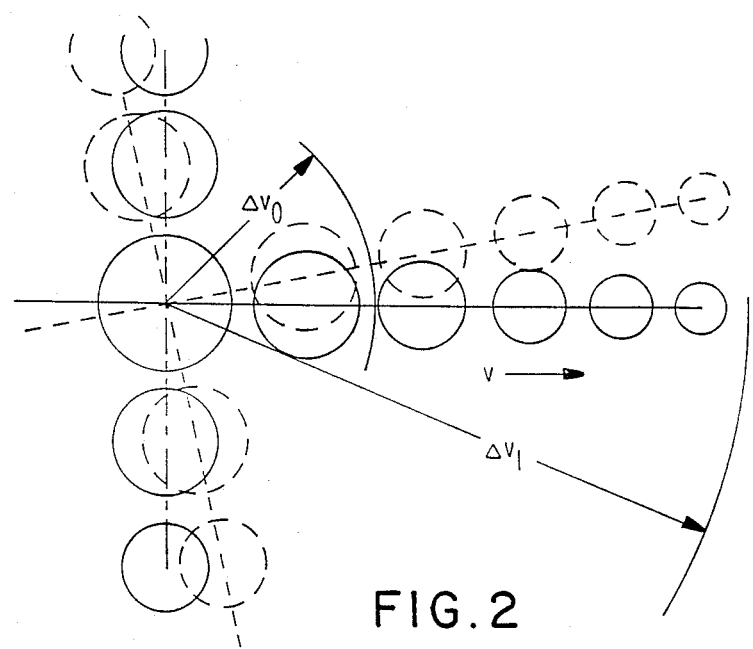
FIG. 2 illustrates the angular sensitivity of a matched filter to spatial frequency bandwidth.

FIG. 2 illustrates a situation in which an idealized matched filter (solid line) of an object is addressed by the Fourier transform of the same object but with some rotation (dotted lines). Clearly, at a low spatial frequency bandwidth, there is an overlap between the two, and this means some signal will be available for interpretation. If the filter has a high frequency cutoff (e.g., $Wn_1$), it is also clear that no signal may be available for robotic interpretation. Moreover, the center of each of the "lobes" is often blocked out when a high frequency filter is utilized.

Figure 3A:
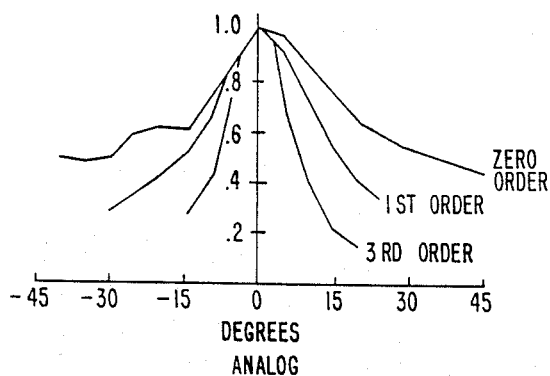
FIGS. 3a and 3b illustrate the sensitivity of a matched filter to image rotation, with a fixed scale size.
Figure 3B:
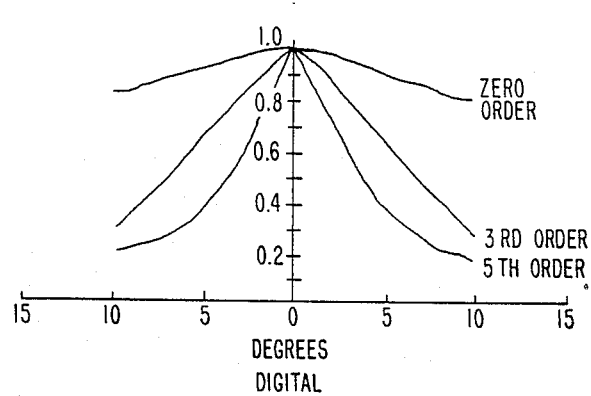

FIG. 3a illustrates three angular sensitivity curves obtained for three separate orders, or spatial frequency bands. When a validated simulation of the correlation process is used, the corresponding curves of FIG. 3b are obtained, and represent the desired result for the object. The angular sensitivity can be seen to be variable over a wide range.

Figure 4:
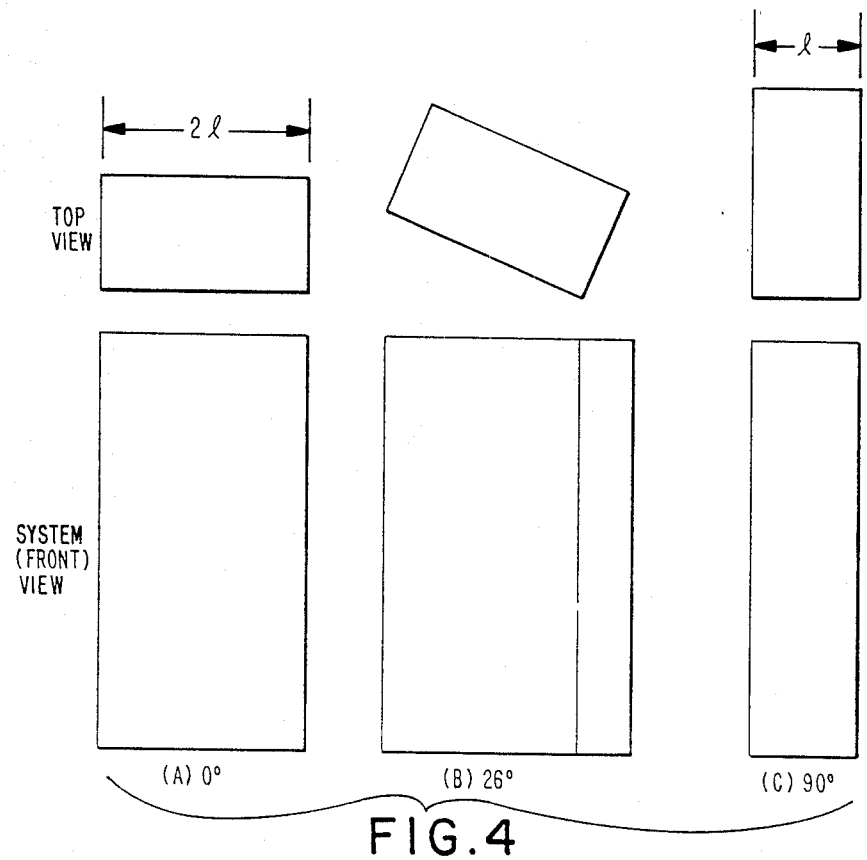
FIG. 4 illustrates a simple object showing the effect of object aspect rotation in a planar view.
Figure 5:
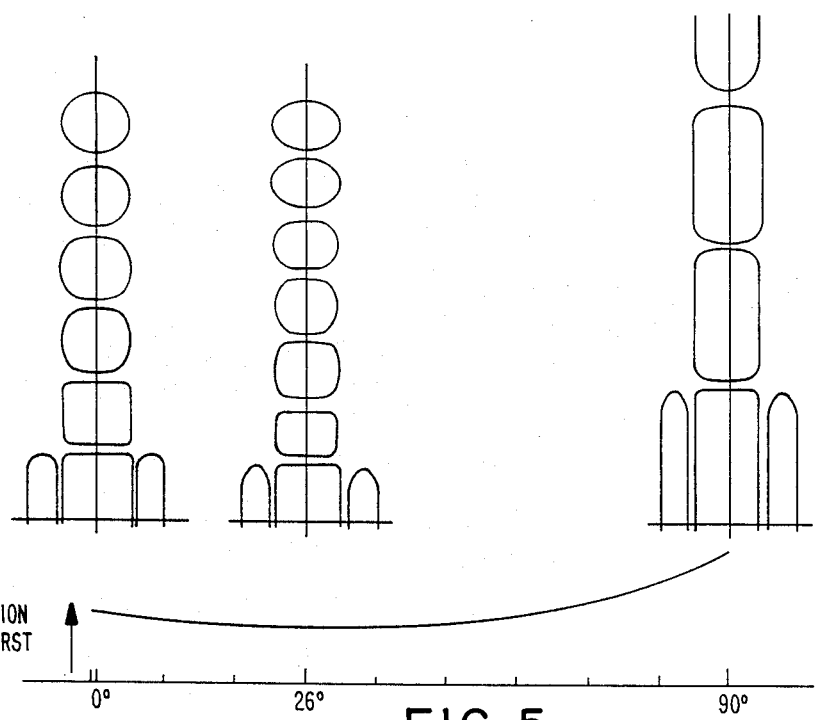
FIG. 5 the effects of the object rotation of FIG. 4 upon the Fourier transforms thereof.
Figure 5:
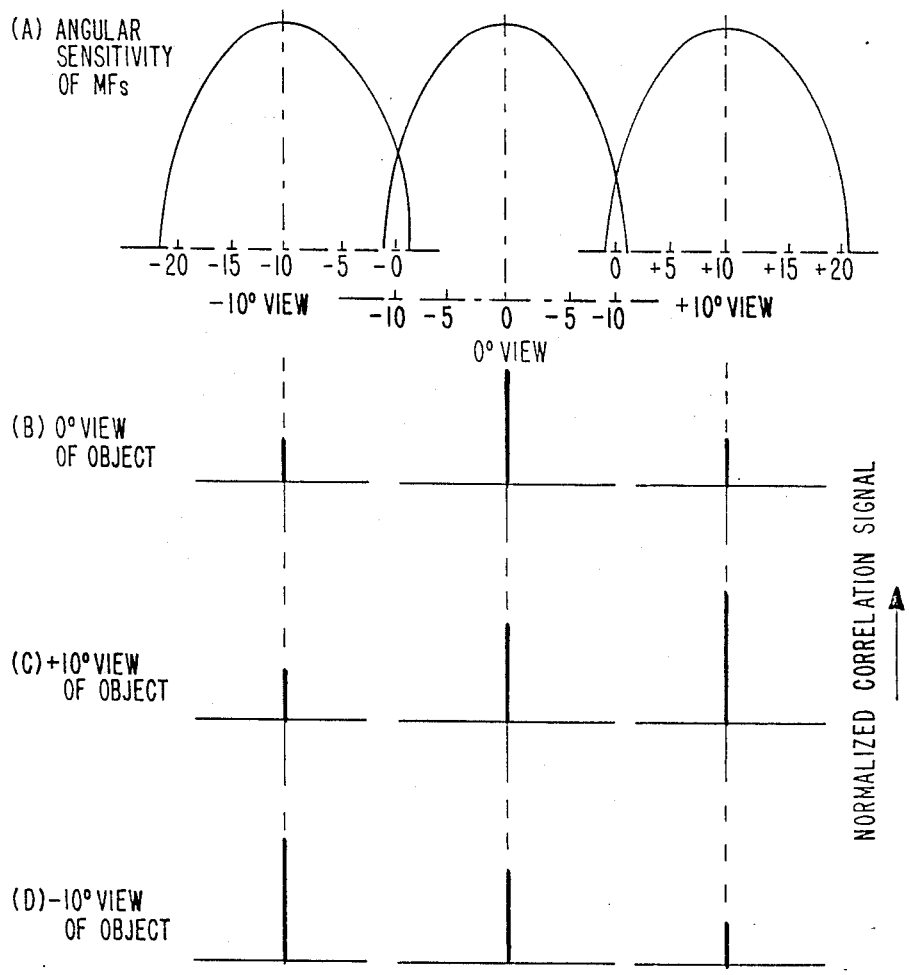

Another important MF factor is the size aspect. Consider the simple object shown in FIG. 4(a). The image projected onto the spatial light modulator (SLM) is that shown as the system (or front) view. The Fourier transform for the view (a), again idealized, is shown in FIG. 5a. The points between the outlined frequency regions represent zeros of the FT, in this case equally spaced. As the object presents a new view, the rectangular image on the SLM undergoes a gradual increase to a maximum at 26 degrees (FIG. 5b), and then decreases until it presents a 90 degree view (FIG. 5c), the narrowest view, i.e., its width is (2 L cosr+L sinr).

During this sequence, the FT starts with something like that shown in FIG. 5a. As the angular rotation of the view increases, the larger area yields a similar FT but one in which the zeros move toward the origin (zero spatial frequency), and at approximately 26 degrees, the FT zeros are closest to the origin. At larger angular views, the corresponding zeros move to higher frequencies until at 90 degrees they are at the greatest set of spatial frequencies. This basic example illustrates that the choices of FT to fabricate an MF must be chosen wisely. As a new view is presented the FT "sweeps" past the fixed FT used to generate the FT hologram (matched filter). A correlation signal proceeds through a sequence of values reaching a maximum at autocorrelation. Thus, the size factor for some objects which present common type of views must be considered in MF construction. Based upon experience, a −3dB range for the correlation signal can represent objects ranged in size from ±4% to ±20%.

Consider an embodiment similar to FIG. 1 having MFs for three different angular views of an object, −10°, 0°, and +10°. Their idealized angular sensitivities are shown in FIG. 6a. If the view encountered, for example, is 0°, FIG. 6b, then the MF for that view would produce the maximum autocorrelation signal, while the other two views would produce signals approximately half as large, as illustrated in FIG. 6b. Alternatively, an object encountered at +10°, FIG. 6c, or at −10°, FIG. 6d, would produce maximum signals from the +10° MF and the −10° MF, respectively. In each respective situation, the MF constructed at −10° and +10° MF would yield no signal in the respective cases, as illustrated in FIGS. 6c and d.

This arrangement allows a logical determination of the angular view of an object by the output signals from three matched filters. If the object has some other angle within the entire viewing range, then an unambiguous array of three signals is obtained. For higher precision, more channels with more MFs could be utilized. For a seven channel system, the signals might look like the array in FIG. 7. The processing logic would be more involved, but the principle of operation is the same. Increased angular sensitivity of a matched filter increases the precision, but requires a larger memory of MFs. In general, the number of MFs required depends upon (a) the object and (b) the detail with which one wants to resolve the object. A MF of an object can be made using low spatial frequencies of the object, yielding low orientation discrimination, perhaps where it is unnecessary to be more discriminating. On the other hand, high spatial frequencies allow a system to be very discriminating because the MF rotational sensitivity is high.

The control circuit of FIG. 8 can be used for the optical correlator system of FIG. 1 with respect to the exemplary embodiment of matched filter responses of FIG. 6a. As illustrated in FIG. 8, the outputs of the detectors L, C and R are normalized because not all MFs have the same autocorrelation signal at perfect registration. The light energy through a MF of one view of an object is often substantially different from that for a second view also in perfect registration with its MF. For a simple symmetrical object, three views of the object would generally produce equal autocorrelation. However, three orthogonal views of an automobile, for example, would generally yield autocorrelation signals which are quite different, and accordingly normalization of the signals is necessary. FIG. 4 illustrates an object with different views.

In summary, the detected signals are normalized and amplified in the Normalization and Gain circuits 40 as required. Each of the three views must have the same gain so that the right view, for example, seen by the right view MF has the same signal as the center view MF has when it "sees" the center view. When the angular fall off curves are made the same, normalization ensures that the center view MF has −3dB response for a 0dB left view response at the same time that the left view MF has −3dB response for a 0dB center view response. The same relationship must prevail for the center view and right view MF responses. Explained differently, except for axially symmetric geometrical objects, most objects have different cross sections for different views. Thus, the energy "passed" by a MF will be different for each different view, and normalization is required. The normalization factor required for each amplifier gain circuit for each matched filter channel is determined from the angular response curves as described herein, and then the normalization factors for all of the matched filter channels are stored as data in a memory 41, from which they are recalled to control each of the amplifier gain circuits.

After normalization, each of the R, C, and L channel signals is converted to a corresponding digital signal by an A to D converter 42. The normalized output signal for each channel is shown in FIG. 6b, c and d for the three major cases of object facing center, and then right and left of center. The normalization and D/A conversion can be readily established for cases of intermediate positions or for n views of the object.

Referring to FIG. 8, each of the L and R digital outputs are compared to C in a comparator 44, and yield a set of signals, C<L, C>L, and C<R, C>R. The following logic equations are applicable, $$(C > R) + (C > L) = \text{Center}$$
$$(C > R) + (C < L) = \text{Facing Left}$$
$$(C < R) + (C > L) = \text{Facing Right}$$

Thus, appropriate AND gates 46 determine the relationships, and develop the commands move right, stop, or move left, which are available for robotic control. However, it should be understood that many alternate electronic approaches can be used to process the matched filter outputs.

Better angular response can be obtained by the following techniques: narrower angular sensitivities (i.e., higher frequency filters), more discriminating logic (e.g., logic which also determines sense as a trial command is executed), and narrower crossover points (e.g., possible −1dB crossovers, and not −3dB as illustrated in FIG. 4), or by some combination of the three techniques.

The object can also be moving across the input so that the matched filter outputs in the correlation plane also vary, thus providing time dependent positional signals. Therefore, a segmented detector, could be utilized for deriving positional information.

The embodiments of FIGS. 1 and 8 utilize individual detectors. Television cameras can also be used, and single lines containing the correlation signal of the sequentially scanned format can be isolated, and used for measurement, which has proven to be satisfactory but inaccurate. The correlation plane can also be scanned with a fiber optic probe, which provides a highly accurate measurement of the maximum value. However, this technique is manual, slow, and inappropriate for the present invention. Accordingly, it is much more advantageous to focus the output of each individual matched filter channel onto a separate detector having a balanced output amplifier so that normalizations can be made pursuant to the quality of each matched filter.

The exemplary embodiment of a MHL-MF configuration shown in FIG. 9 can provide information on articulation based upon the orientation, position and size of the object. If the class of object is such as to be uniform, then a size determination might be used as a distance measurement. For a multiple parameter embodiment, an array of detectors is required, such as a CCD type in which the array is subdivided and processed according to the parameters, in the illustrated embodiment, nine segments.

FIG. 9 illustrates a modulated input beam 48, a multiple 3×3 holographic lens 50, a matched filter array 52, a holographic lens and/or fly's eye version MHL 54, and a partitioned detector array 56. In this embodiment, a normalizing fabrication plate 58 is placed in front of the matched filter plate 101. It consists of a plate large enough to block the [(3×3)−1]beams from the MHL 50 to the MF plate 52. The one beam permitted through to the MF plate passes through a rotatable polarizer 60. This is a circularly mounted piece of sheet polaroid (HN type) which is linearly polarized. Since the laser beam is linearly polarized, $\theta$ rotation of the circularly mounted polarizer 60 causes a sine $\theta$ change in the intensity of the passed beam. Thus, each position can be accommodated for an individual nonelectronic normalization. The R-beam must be equally set. In operation, the fabrication plate 58 would be selectively positioned in x and y for each matched filter channel, and the rotation of the polarizer controlled and positioned by data in memory for that particular matched filter channel to achieve normalization of all of the matched filter channels. The fabrication plate can be stepped in sequence in x and y, as by stepper motors, to sequentially position it for each matched filter channel. The polarizer could also be placed in front of the MHL 50, or anywhere in the chain of optical elements of the correlator in which the MF beam is affected. The technique for mounting and driving the rotation of the polarizer are known in the art, such as by driving a stepper motor to turn the polarizer 60. In a preferred embodiment, control signals for the polarizer would be computer (PC) derived.

Unlike the usual neutral density controls in a fabrication which are set by sensing the laser beam, the polarizer should be adjusted in both the signal and reference beam channels by computer to a predetermined amount which is derived from test data on the robotic piece during a rotation test.

In some embodiments the MF correlation robotic vision system will require a large MF library. The capacity of the memory can be determined once the application is formulated and the degree of MF discrimination clearly established.

The equation for capacity C has been previously explained. Using an argon laser and a 25 mm focal length Fourier transform lens, over one thousand $MF/cm^2$ can be stored with modest layout considerations. Depending upon the particular embodiment and application, a multiplicity of matched filters can be stored for several different aspects of several different targets.

In many correlator applications, it will be sufficient to take a single inverse FT of the MF array for processing. In a robotic vision system, individual or grouped FT can be utilized so that individual correlation signals are produced (as in FIG. 1). Therefore, it is important that the memory be appropriately organized. For example, scale size can be determined first to provide a bank of filters for a particular scale size S to have their outputs processed simultaneously, and for another scale size S1, the processing system could be switched as appropriate to enable a single processor to be employed.

The spatial light modulator could be liquid crystal, photorefractive, thermoplastic or magneto-optic, and can be either transmissive or reflective in nature. The SLM should operate at several cycles per second, and have a resolution of 50 cycles per mm at a contrast rate of 0.5, an absence of image retention, a lifetime of several hundred thousand cycles, and provide seven or eight gray levels as required.

The matched filter response can be accurately characterized and made quite efficient through dichromated gelatin or thermoplastic media, and in one embodiment, MFs of a sufficiently high phase frequency could be computer generated to provide a higher degree of precision.

FIG. 10 illustrates an arrangement for the preparation of a matched filter (MF) 68 of an object in which an object 70 is placed at one aspect of interest and is imaged by lens 72 through a beam splitter 74 onto a spatial light modulator (SLM) 76. A laser beam from a laser 78 is split by a beam splitter 80 into a signal path 82 and a reference path 84. The laser beam in the signal path 82 is spatially modulated by the SLM 76, and a Fourier transform is taken with a fourier transform lens 86. The laser beam in the reference path 84 is spatially filtered at 88, collimated at 90, and directed through a shutter 92 to the matched filter plate 68 where interference occurs and the MF is recorded When a different object aspect is desired, the MF plate is moved to a new position, and the process is repeated The memory bank of the robotic vision system is complete when all aspects of the object are recorded. In the practice of the present invention, the recording medium can be a photographic emulsion, dichromated gelatin, photopolymer, and the like, and can be coated or mounted on a suitable substrate such as a glass plate, thin film, and the like.

In using the arrangement of FIG. 10 to fabricate matched filters, several precautions must be taken prior to fabrication. First, the length of the reference path 84 and the signal beam path 82 must be measured, both from the center of the beam splitter 80. Account must be taken of the glass in each path and of the total length of the glass path being increased by the index of refraction of the glass, typically 1.5. When such accounting has been made and the two paths compared, it is necessary that they be equal in total length to a difference of no more than the coherence length of the laser, which is typically several centimeters. In practice, a difference of 2 millimeters is readily achievable.

Knowing the Fourier transform lens 86 focal length (360 mm in an exemplary embodiment) and the operational wavelength, 6328 angstroms being typical, the system factor S given earlier can be computed, and is 4.39 cycles per mm per mm. Using representative criteria developed earlier, a cut off spatial frequency of 10 cycles/mm. can be used. Thus, the center to center distance for matched filter spacing in the array illustrated for example in FIG. 9 becomes $(2 \times 10)/4.39 = 4.56$ millimeters.

The second provision for the set up of FIG. 10 is that during fabrication of an array, an aperture is used to permit one filter to be made while all others are blocked, and then the aperture is moved 4.56 mm. to the next location, and a second filter is made. Coincidentally, the movable aperture must also have a spatial frequency radius of 10 cycles/mm and therefore be 4.56 mm in diameter. FIG. 3 and 4 of U.S. Pat. No. 4,703,944 illustrate a device which enables the blanking of all positions but one to be achieved.

Thirdly, the elements of FIG. 10 must all be aligned, with particularly attention being paid to having the target of interest focused upon the spatial light modulator 76 in the input of FIG. 10. Reading out of the spatial light modulator 76 requires a polarizer 94 in front of the SLM and an analyzer 96 therebehind. These three elements must be individually aligned and then in tandem so that the output of the group has the same polarization as the reference path beam. In order to fabricate the holographic matched filter, the reference and the signal beam polarizations must be coplanar for maximum effectiveness. Any other alignment decreases the quality of the matched filter, and an orthogonal polarization will not even interact holographically.

The Fourier Transform lens 86 can be a glass lens, but a specially designed multiple holographic lens is preferably used in order to have many FT replications of the object to address all desired MF positions. When a holographic lens is illuminated with a collimated beam of radiation, an off-axis focus is achieved. If the beam remains collimated but the wavelength is changed, a second off-axis focus having a different offset angle and focal distance than the first is obtained. This result is the consequence of the fact that physically a hologram is basically a highly complex diffraction grating. It is often advantageous to fabricate a matched filter at one wavelength, and to use the filter at a second wavelength. For example, some images are recorded best in a matched filter at a wavelength in the blue light spectra and played back best at a wavelength in the red light spectra. In this situation, the operating light signal has a tendency to alter the image formed in the matched filter. This tendency is substantially reduced if the matched filter is operated at the wavelength used to fabricate the filter.

Moreover, it must be recognized that each different object aspect view yields a unique matched filter which in itself has angular scale sensitivities. In a robotic vision system, each different aspect view matched filter must be treated as a new object matched filter since each matched filter is different, and thus yields different signals. Accordingly, normalization is required to the same standard, i.e., a properly aligned matched filter. Moreover, the normalization is affected by angular sensitivity, and so compensation is necessary, which has not been recognized by the prior art.

For example, for a robotic system for L-C-R movements, a matched filter must be fabricated for each of the left, center and right views. Then an angular sensitivity curve must be generated for each matched filter to produce a working response curve, which is the response curve to be normalized. An angular response curve cannot be generated for the center position view, and then used for the left and right views as the angular response curve for each matched filter is different.

The number of MFs required is dependent upon the response of each individual filter. For example, a particular target for which a matched filter is made might show an angular response as shown by one of the lobes of FIG. 11. If this is an overhead view and the object always looks the same when rotated, each response looks the same so that a complete memory for 360° coverage would have a "picket fence" response as shown in FIG. 11. Note that the responses are all equally spaced and of equal height.

Now consider a moving robotic part. If the robotic part is considered from different aspect views, the set of responses of FIG. 12 might be obtained. While the individual responses may be 3db responses (i.e. the base line is located at ½ the peak level), note that the angular widths vary in size and the peak correlation signals have different heights. These arise because the different aspect views may have more energy in one view than in another.

The net result is that their amplitudes must be brought to a common level. This can be accomplished electronically by a normalizing amplifier as described hereinabove, or optically as by selectively exposing the matched filter photo plates to uniformly "darken" them, bringing the amplitudes down to one common maximum height. Then, the resultant responses would appear as in FIG. 13. The numbers represent arbitrary values, and are for illustration only. Note, however, that the peak values are equal. The number of matched filters which are required for a particular angular range can then be determined after the angular responses are normalized as shown in FIG. 13.

While several embodiments and variations of the present invention for a robotic vision system are described in detail herein, it should be apparent that the disclosure and teachings of the present invention will suggest many alternative designs to those skilled in the art.

What is claimed is:

1. A system for optically comparing an input image with optical information stored in matched filters to provide identification and aspect information about the input image, comprising:
    a. a spatial light modulator, having incident thereon an input image to be analyzed, which spatially modulates a coherent beam of radiation to form a spatially modulated radiation beam;
    b. a multiple holographic lens having the spatially modulated radiation beam incident thereon, for performing a multiple number of Fourier transformations thereon to obtain an array of a multiple set of Fourier transforms of the spatially modulated radiation beam;
    c. an array of matched filters having the array of Fourier transforms incident thereon, with each matched filter comprising a Fourier transform hologram of an aspect view of an object of interest and passing an optical correlation signal in its matched filter channel in dependence upon the degree of correlation of the Fourier transform of the spatially modulated radiation beam with the Fourier transform recorded by the matched filter;
    d. an inverse Fourier transform lens means, receiving the optical correlation outputs of said array of matched filters, for performing an inverse Fourier transformation on each optical correlation output;
    e. a detector means for detecting the inverse Fourier transform of each optical correlation output, and for producing a detector output signal representative of each optical correlation output;
    f. a normalizing means for each matched filter channel for producing a normalized detector output signal therefrom; and
    g. comparator means for comparing the magnitudes of the normalized detector output signals to generate output directional control signals therefrom, as determined by the aspect information about the input image.

2. A system for optically comparing an input image with optical information stored in matched filters to provide identification and aspect information about the input image, as claimed in claim 1, further comprising:
    a. said array of matched filters including at least a center matched filter for a center on-line view of an object of interest, a left matched filter for a left of center angular view of the same object of interest, and a right matched filter for a right of center angular view of the same object of interest;
    b. said detector means including at least a center detector for said center matched filter, a left detector for said left matched filter, and a right detector for said right matched filter;
    c. said comparator means including at least a left comparator means for comparing the magnitude of the left detector output signal with the magnitude of the center detector output signal to determine which magnitude is greater, and a right comparator means for comparing the magnitude of the right detector output signal with the magnitude of the center detector output signal to determine which magnitude is greater; and
    d. directional means, receiving the outputs of said left comparator means and said right comparator means, for generating an output directional control signal representative of the determined angular position of the object of interest.

3. A system for optically comparing an input image with optical information stored in matched filters to provide identification and aspect information about the input image, as claimed in claim 1, said normalizing means including a normalizing amplifier circuit for each detector output signal for producing a normalized detector output signal.

4. A system for optically comparing an input image with optical information stored in matched filters to provide identification and aspect information about the input image, as claimed in claim 1, said normalizing means including an optical normalizer in each matched filter channel.

5. A system for optically comparing an input image with optical information stored in matched filters to provide identification and aspect information about the input image, as claimed in claim 1, further including a processor means, coupled to receive the detector output signals from said detector means, for comparing the relative magnitudes of the signals to determine aspect information about the input image, said processor means further including a normalizing circuit for each detector output signal, an analog to digital converter for converting each normalized detector output signal to a corresponding digital signal, and comparator circuit means for comparing the magnitudes of the corresponding digital signals.

6. A system for optically comparing an input image with optical information stored in matched filters to provide identification and aspect information about the input image, as claimed in claim 1, said normalization means including developing an angular response curve for each individual matched filter, and setting the maximum amplitude signals for all of the angular response curves to be substantially equal to normalize the angular response curves, determining the angular field of view for each normalized angular response curve, and determining the number of matched filters required to yield a desired overall angular detection response.

7. A method for optically comparing an input image with optical information stored in matched filters to provide identification and aspect information about the input image, comprising:
   a. directing an input image to be analyzed onto a spatial light modulator to spatially modulate a coherent beam of radiation to form a spatially modulated radiation beam;
   b. directing the spatially modulated radiation beam onto a multiple holographic lens to perform a multiple number of Fourier transformations thereon to obtain an array of a multiple set of Fourier transforms of the spatially modulated radiation beam;
   c. directing the array of Fourier transforms onto an array of matched filters, with each matched filter comprising a Fourier transform hologram of an aspect view of an object of interest and passing an optical correlation signal in its matched filter channel in dependence upon the degree of correlation of the Fourier transform of the spatially modulated radiation beam with the Fourier transform recorded by the matched filter;
   d. directing the optical correlation outputs of said array of matched filters onto an inverse Fourier transform lens means to perform an inverse Fourier transformation on each optical correlation output;
   e. detecting the inverse Fourier transform of each optical correlation output and producing a detector output signal representative of each optical correlation output;
   f. normalizing the signal through each matched filter channel to produce a normalized detector output signal therefrom, said normalizing step including developing an individual angular response curve for each matched filter, with each individual angular response curve having an individual peak amplitude and an individual angular range, and normalizing the signal through each matched filter channel to equalize the peak amplitudes of all of the matched filter channels, which can result in different angular ranges for each matched filter channel;
   g. comparing the magnitudes of the normalized detector output signals to generate output directional control signals therefrom, as determined by the aspect information about the input image.

8. A method for optically comparing an input image with optical information stored in matched filters to provide identification and aspect information about the input image, as claimed in claim 7, further comprising:
   a. said step of directing the array of Fourier transforms onto an array of matched filters including directing the array of Fourier transforms onto at least a center matched filter for a center on-line view of an object of interest, a left matched filter for a left of center angular view of the same object of interest, and a right matched filter for a right of center angular view of the same object of interest;
   b. detecting the inverse Fourier transforms with at least a center detector for said center matched filter, a left detector for said left matched filter, and a right detector for said right matched filter;
   c. comparing the magnitudes of the normalized detector output signals by at least a left comparator means for comparing the magnitude of the left detector output signal with the magnitude of the center detector output signal to determine which magnitude is greater, and a right comparator means for comparing the magnitude of the right detector output signal with the magnitude of the center detector output signal to determine which magnitude is greater; and
   d. utilizing the outputs of said left comparator means and said right comparator means to generate an output directional control signal representative of the determined angular position of the object of interest.

9. A method for optically comparing an input image with optical information stored in matched filters to provide identification and aspect information about the input image, as claimed in claim 7, said normalizing step being performed by a normalizing amplifier circuit for each detector output signal for producing a normalized detector output signal, including storing in memory an amplification factor for each normalizing amplifier circuit to achieve normalized detector output signals for all of the matched filter channels.

10. A method for optically comparing an input image with optical information stored in matched filters to provide identification and aspect information about the input image, as claimed in claim 7, said normalizing step being performed by an optical normalization in each matched filter channel.

11. A method for optically comparing an input image with optical information stored in matched filters to provide identification and aspect information about the input image, as claimed in claim 10, said normalizing step being performed by an optical attenuating filter in each matched filter channel.

12. A method for optically comparing an input image with optical information stored in matched filters to provide identification and aspect information about the input image, as claimed in claim 11, said normalizing step being performed by a rotatable polarization attenuating filter in each matched filter channel, wherein the rotatable polarization filter is selectively rotated for each matched filter channel to achieve normalization for all of the matched filter channels.

13. A method for optically comparing an input image with optical information stored in matched filters to provide identification and aspect information about the input image, as claimed in claim 10, said normalizing step being performed by controlling the power to a laser illuminating each matched filter channel.

14. A method for optically comparing an input image with optical information stored in matched filters to provide identification and aspect information about the input image, as claimed in claim 7, further including comparing the relative magnitudes of the detector output signals to determine aspect information about the input image, providing a normalizing circuit for each detector output signal, an analog to digital converter for converting each normalized detector output signal to a corresponding digital signal, and comparator circuit means for comparing the magnitudes of the corresponding digital signals.

15. A method for optically comparing an input image with optical information stored in matched filters to provide identification and aspect information about the input image, as claimed in claim 7, further comprising, after setting the peak amplitude signals for all of the angular response curves to be substantially equal to normalize the angular response curves, determining the angular field of view for each normalized angular response curve, and determining the number of matched filters required to yield a desired overall angular detection response.

* * * * *

UNITED STATES PATENT AND TRADEMARK OFFICE
CERTIFICATE OF CORRECTION

PATENT NO. : 4,958,376

DATED : September 18, 1990

INVENTOR(S) : Kenneth G. Leib

It is certified that error appears in the above-identified patent and that said Letters Patent is hereby corrected as shown below:

The title page should be deleted to appear as per attached title page.

Signed and Sealed this

Tenth Day of November, 1992

Attest:

DOUGLAS B. COMER

Attesting Officer     Acting Commissioner of Patents and Trademarks

United States Patent [19]

Leib

[11] Patent Number: 4,958,376
[45] Date of Patent: Sep. 18, 1990

[54] ROBOTIC VISION, OPTICAL CORRELATION SYSTEM

[75] Inventor: Kenneth G. Leib, Wantagh, N.Y.

[73] Assignee: Grumman Aerospace Corporation, Bethpage, N.Y.

[21] Appl. No.: 236,519

[22] Filed: Aug. 25, 1988

Related U.S. Application Data

[63] Continuation-in-part of Ser. No. 814,209, Dec. 27, 1985, abandoned.

[51] Int. Cl.$^5$ .............................................. G06K 9/00
[52] U.S. Cl. ..................................... 382/31; 350/162.12
[58] Field of Search .................... 382/31; 350/162.12, 350/162.13, 162.14

[56] References Cited

U.S. PATENT DOCUMENTS

3,779,492 12/1973 Grumet ................................. 350/3.73
3,851,308 11/1974 Kawasaki et al. ................. 340/146.3

Primary Examiner—Leo H. Boudreau
Assistant Examiner—Michael Cammarata
Attorney, Agent, or Firm—Scully, Scott, Murphy & Presser

[57] ABSTRACT

A robotic vision, optical correlation system which optically compares an input image with optical information stored in a multiple array of matched filters to provide identification and aspect information about the input image. The input image is incident upon a spatial light modulator, and the input image spatially modulates a coherent beam of radiation. A multiple holographic lens has the spatially modulated radiation beam incident thereon, and performs a multiple number of Fourier transformations thereon to obtain an array of a multiple set of Fourier transforms of the spatially modulated radiation beam. The array of matched filters has the array of Fourier transforms incident thereon, and each matched filter comprises a Fourier transform hologram of an aspect view of an object of interest. Each matched filter passes an optical correlation signal in dependence upon the degree of correlation of the Fourier transform of the spatially modulated radiation beam with the Fourier transform recorded by the matched filter. An inverse Fourier transform lens receives the optical correlation outputs of the array of matched filters, and performs an inverse Fourier transformation on each optical correlation output. A detector then detects the inverse Fourier transform of each optical correlation output, and produces a detector output signal representative thereof. A processing circuit compares the relative magnitudes of the signals to determine aspect information about the input image. The present invention includes a normalizing means for each matched filter channel in the system, which can be electronic or optical, to normalize the signals for the different matched filters. The normalizing means operates on the basis of a separate angular response curve which is generated for each matched filter.

15 Claims, 6 Drawing sheets

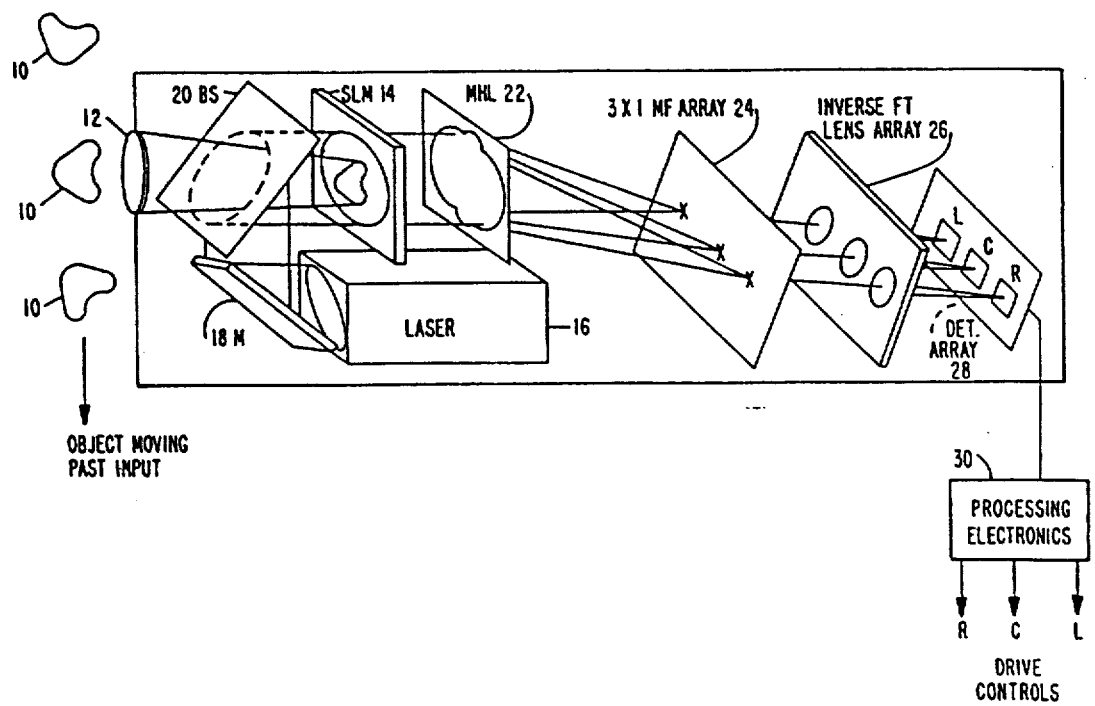

UNITED STATES PATENT AND TRADEMARK OFFICE
CERTIFICATE OF CORRECTION

PATENT NO. : 4,958,376

DATED : September 18, 1990

INVENTOR(S) : Kenneth G. Leib

It is certified that error appears in the above-identified patent and that said Letters Patent is hereby corrected as shown below:

Column 4, line 20: "and" should read as --and in which:--

Column 4, line 40: "recorded matched" should read as --recorded on matched--

Column 4, line 50: "aspect of" should read as --aspect views of--

Column 4, line 53: "equal tude' should read as --equal in amplitude--

Column 6, line 12: "holographic medium," should read as --holographic structure having size, wavelength, thickness of the storage medium,--

Column 11, line 60: "recorded When" should read as --recorded. When--

Column 11, line 62: "repeated The" should read as --repeated. The--

UNITED STATES PATENT AND TRADEMARK OFFICE
CERTIFICATE OF CORRECTION

PATENT NO. : 4,958,376

DATED : September 18, 1990

INVENTOR(S) : Kenneth G. Leib

It is certified that error appears in the above-identified patent and that said Letters Patent is hereby corrected as shown below:

In the Drawings, Sheet 3 of 3 add --FIG. 6-- to the bottom of the page.

Add the following FIGURES 7-10:

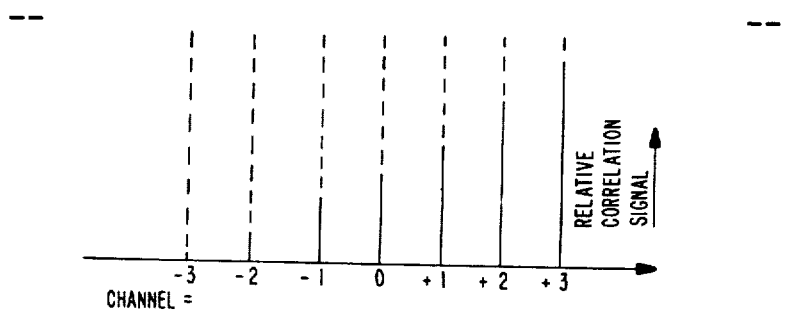

FIG.7

UNITED STATES PATENT AND TRADEMARK OFFICE
CERTIFICATE OF CORRECTION

PATENT NO. : 4,958,376

DATED : September 18, 1990

INVENTOR(S) : Kenneth G. Leib

It is certified that error appears in the above-identified patent and that said Letters Patent is hereby corrected as shown below:

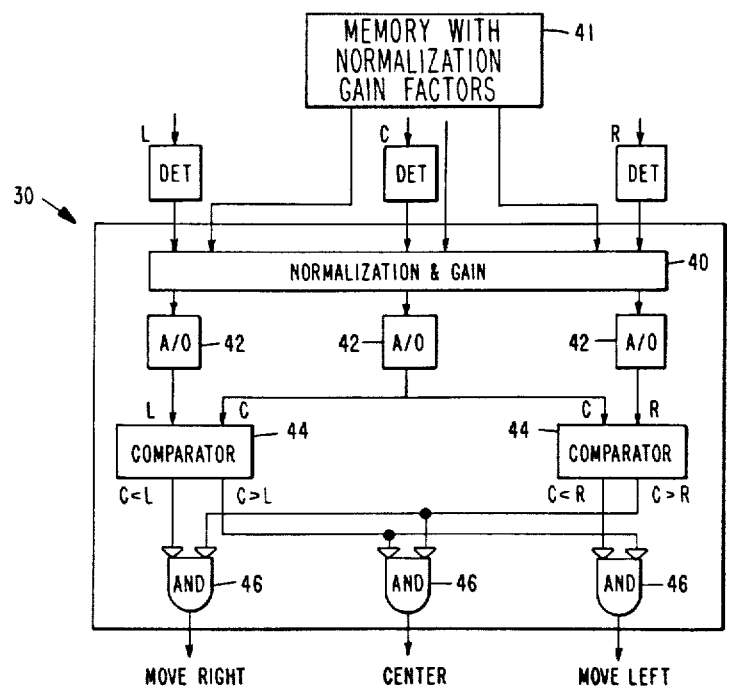

FIG.8

UNITED STATES PATENT AND TRADEMARK OFFICE
CERTIFICATE OF CORRECTION

PATENT NO. : 4,958,376

DATED : September 18, 1990

INVENTOR(S) : Kenneth G. Leib

It is certified that error appears in the above-identified patent and that said Letters Patent is hereby corrected as shown below:

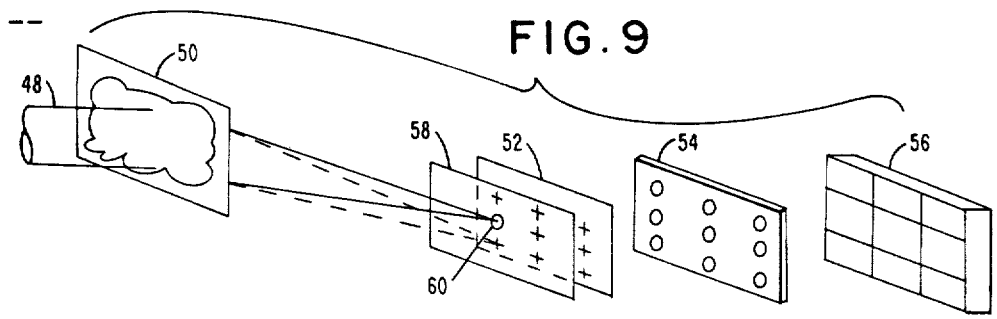

FIG. 9

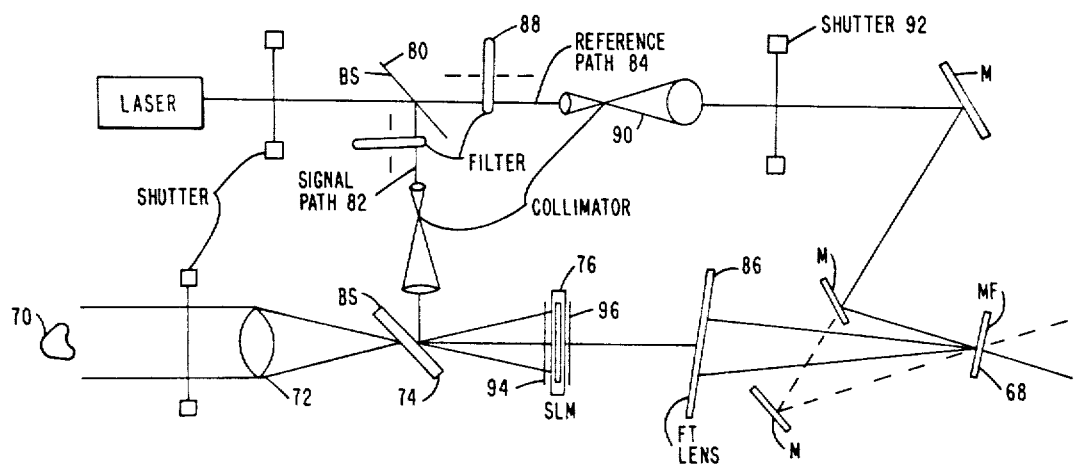

FIG. 10

UNITED STATES PATENT AND TRADEMARK OFFICE
CERTIFICATE OF CORRECTION

PATENT NO. : 4,958,376

DATED : September 18, 1990

INVENTOR(S) : Kenneth G. Leib

It is certified that error appears in the above-identified patent and that said Letters Patent is hereby corrected as shown below:

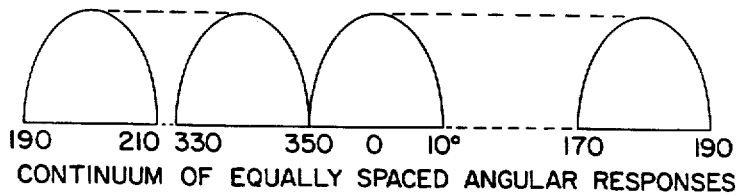

CONTINUUM OF EQUALLY SPACED ANGULAR RESPONSES
FIG. 11

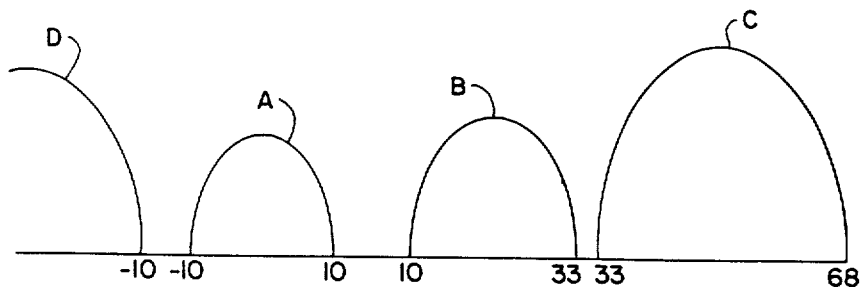

ANGULAR RESPONSES OF ROBOTIC PIECE
ROTATED ABOUT ITS VERTICAL AXIS
FIG. 12

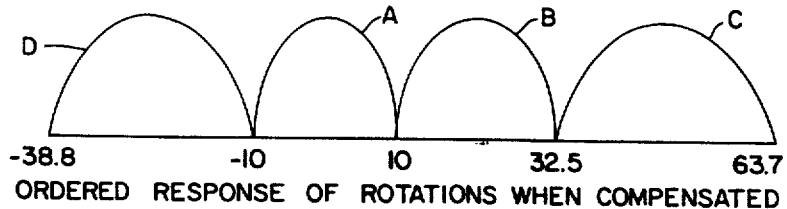

ORDERED RESPONSE OF ROTATIONS WHEN COMPENSATED
FIG. 13